(12) United States Patent
Jahnke et al.

(10) Patent No.: US 11,035,628 B2
(45) Date of Patent: Jun. 15, 2021

(54) SYSTEM FOR FAST DRAINING OF AN AIRFAN HEAT EXCHANGER AND METHODS OF USING THE SAME

(71) Applicant: FuelCell Energy, Inc., Danbury, CT (US)

(72) Inventors: Fred C. Jahnke, Rye, NY (US); Matthew Lambrech, Sherman, CT (US); Jeffrey Brown, Newtown, CT (US)

(73) Assignee: FuelCell Energy, Inc., Danbury, CT (US)

( * ) Notice: Subject to any disclaimer, the term of this patent is extended or adjusted under 35 U.S.C. 154(b) by 189 days.

(21) Appl. No.: 15/992,954

(22) Filed: May 30, 2018

(65) Prior Publication Data
US 2019/0368830 A1    Dec. 5, 2019

(51) Int. Cl.
*F28F 17/00*    (2006.01)
*F28F 27/00*    (2006.01)

(52) U.S. Cl.
CPC ............... *F28F 17/00* (2013.01); *F28F 27/00* (2013.01); *F28F 2265/06* (2013.01); *F28F 2265/14* (2013.01)

(58) Field of Classification Search
CPC .......... F28F 17/00; F28F 17/005; F28F 27/00; F28F 27/006; F28F 2265/22; F28F 2265/14; F28F 2265/06; F28D 2021/0043; F28B 9/005; F28B 9/08; F25D 2400/22; B08B 9/032; B08B 9/0321; B08B 9/0328; F28G 1/163

USPC ......................................... 62/303; 134/22.12
See application file for complete search history.

(56) References Cited

U.S. PATENT DOCUMENTS

| | | | | |
|---|---|---|---|---|
| 4,081,930 A | * | 4/1978 | Jones | B24C 3/325 134/169 C |
| 4,216,026 A | * | 8/1980 | Scott | B08B 9/0555 134/4 |
| 4,534,802 A | * | 8/1985 | Gates | B05B 15/00 134/22.12 |
| 4,645,542 A | * | 2/1987 | Scharton | B08B 9/0326 134/1 |
| 5,603,228 A | * | 2/1997 | Barthold | B08B 9/0327 137/240 |
| 5,718,119 A | * | 2/1998 | Wakita | F25B 45/00 62/303 |

(Continued)

FOREIGN PATENT DOCUMENTS

| | | |
|---|---|---|
| DE | 10 2008 029 180 A1 | 12/2009 |
| EP | 1 222 704 B1 | 4/2006 |
| WO | WO-2010/108606 A1 | 9/2010 |

*Primary Examiner* — Jianying C Atkisson
*Assistant Examiner* — Jose O Class-Quinones
(74) *Attorney, Agent, or Firm* — Foley & Lardner LLP

(57) ABSTRACT

A system for draining an airfan heat exchanger includes an airfan heat exchanger including a housing, a pressurized gas source fluidly coupled to the airfan heat exchanger and configured to hold a purging gas at a predetermined pressure, and a controller configured to control delivery of the purging gas to the airfan heat exchanger. The pressurized gas source is configured to provide a flow of the purging gas to the airfan heat exchanger and thereby drain water held in the airfan heat exchanger. The purging gas to the airfan will cause the airfan to drain quickly avoiding potential damage to the airfan from freezing of the water during cold weather.

18 Claims, 7 Drawing Sheets

(56) References Cited

U.S. PATENT DOCUMENTS

| | | |
|---|---|---|
| 6,899,969 B2 | 5/2005 | Kanno |
| 7,063,732 B2 * | 6/2006 | Katikaneni ............ B01D 53/48 585/822 |
| 7,270,903 B2 | 9/2007 | Osborne et al. |
| 7,354,669 B2 | 4/2008 | Hobmeyr et al. |
| 7,390,585 B2 | 6/2008 | Matoba |
| 7,531,259 B2 | 5/2009 | Kratschmar et al. |
| 7,645,533 B2 | 1/2010 | Fukuda |
| 7,718,287 B2 | 5/2010 | Sparschuh et al. |
| 7,736,777 B2 * | 6/2010 | Venkataraman .. H01M 8/04097 429/429 |
| 7,883,810 B2 | 2/2011 | Fagley et al. |
| 8,192,885 B2 | 6/2012 | Rapaport et al. |
| 8,277,999 B2 | 10/2012 | Izutani et al. |
| 8,574,776 B2 | 11/2013 | Clingerman et al. |
| 8,945,784 B2 | 2/2015 | Sato et al. |
| 2006/0272681 A1 * | 12/2006 | Steinkiste ............. B08B 9/0328 134/22.12 |
| 2009/0176134 A1 * | 7/2009 | Jahnke ................ H01M 8/0662 429/413 |
| 2014/0227618 A1 | 8/2014 | Handgraetinger et al. |
| 2014/0272646 A1 | 9/2014 | Forthoffer |
| 2016/0141656 A1 | 5/2016 | Yamamoto et al. |
| 2016/0141671 A1 | 5/2016 | Ogawa et al. |
| 2016/0204454 A1 | 7/2016 | Hakala |

\* cited by examiner

SYSTEM FOR FAST DRAINING OF AN AIRFAN HEAT EXCHANGER AND METHODS OF USING THE SAME

STATEMENT AS TO RIGHTS TO INVENTIONS MADE UNDER FEDERALLY SPONSORED RESEARCH AND DEVELOPMENT

This invention was made with Government support under Cooperative Agreement DE-EE0003679 awarded by the U.S. Department of Energy. The Government has certain rights in the invention.

BACKGROUND

The present disclosure relates generally to the field of air fan heat exchangers for a cooling system. Specifically, the present disclosure relates to an air fan heat exchanger having a pressurized gas source for fast draining of the airfan heat exchanger when the cooling system stops operating.

The last cooling step of cooling shifted anode gas from a high temperature fuel cell system, for example, incorporates direct contact between coolant water and the anode gas. This last cooling step provides cooling of the gas with a very low pressure drop and recovers water that is condensed from the anode gas during cooling. As the cooling water contacts the hot anode gas, heat from the anode gas is transferred to the water, causing the water to become hot. The heated water is then cooled using an airfan heat exchanger so that heat is transferred from the water to the air. Optionally, part of the heat may be recovered for other uses by cooling the water prior to the water being sent to the airfan.

One problem encountered during operation of the fuel cell system is freezing of the water in the airfan heat exchanger, particularly of the water in the airfan tubes when the fuel cell system and/or cooling system shuts down or stops operating (due to causes such as a power loss). When the fuel cell system stops operating, the circulation of the water and the heating of the water stops and the water will cool to an ambient temperature, which during freezing weather means the water will freeze in the tubes of the airfan. When the fuel cell system is operating during periods of very cold weather, water in the airfan may freeze prior to draining of the water from the airfan because vapor is required to travel to a high point of the airfan before the water can drain out. Draining the water requires between approximately 2 to 4 minutes (or even longer), during which time the tubes of the airfan may freeze due to the very cold temperatures. Freezing of the tubes of the airfan leads to rupture of the tubes caused by expanding ice which has frozen inside the tubes and thereby damages the airfan. Also, the performance of the airfan heat exchanger and the performance of the fuel cell system are adversely affected by leaking water due to the damage to the airfan, as well as by leakage of a potentially explosive gas. Additionally, repair costs and downtime costs are associated with repairing or replacing or bypassing the damaged tubes.

One approach to this problem involved providing an air vent, which allows air to enter equipment similar to the airfan to shorten the water draining time. However, introducing air into a fuel cell system could potentially result in an explosive mixture, so this approach is not feasible in a fuel cell context.

A need exists for technology for a cost-effective and efficient design for fast draining of an airfan heat exchanger of a cooling system. Specifically, a need exists for technology which can drain water from the airfan heat exchanger before the water can freeze in the tubes of the airfan. Further, a need exists for technology which can drain water from the airfan even in cases of power loss or power interruptions.

SUMMARY

Additional features, advantages, and embodiments of the present disclosure may be set forth from consideration of the following detailed description, drawings, and claims. Moreover, it is to be understood that both the forgoing summary of the present disclosure and the following detailed description are exemplary and intended to provide further explanation without further limiting the scope of the present disclosure claimed.

According to a first exemplary embodiment, a system for fast draining an airfan heat exchanger includes an airfan heat exchanger including a housing, a pressurized gas source fluidly coupled to the airfan heat exchanger and configured to hold a purging gas at a predetermined pressure, and a controller configured to control delivery of the purging gas to the airfan heat exchanger. The pressurized gas source is configured to provide a flow of the purging gas to the airfan heat exchanger and thereby drain water held in the airfan heat exchanger.

According to one aspect of the system, the purging gas is nitrogen.

According to another aspect of the system, the pressurized gas source is fluidly coupled to a fluid inlet of the airfan heat exchanger. The fluid inlet of the airfan heat exchanger is positioned at a high point of the housing of the airfan heat exchanger.

According to another aspect of the system, the predetermined pressure is 25 psig or more.

According to another aspect of the system, the predetermined pressure is within a range of 25 psig and 2000 psig.

According to another aspect of the system, the controller includes a fail open solenoid valve configured to automatically open or to open on loss of power, and thereby provide the purging gas to the airfan heat exchanger when the airfan heat exchanger stops operating.

According to another aspect, the system also includes a check valve connected to the pressurized gas source and configured to prevent a backflow of water into the pressurized gas source from the airfan heat exchanger.

According to a second exemplary embodiment, a cooling system for a fuel cell system includes a cooler configured to receive both a hot anode exhaust gas from the fuel cell system and coolant water through a fluid inlet and further configured to expel cooled anode exhaust gas and heated water through a fluid outlet, a first airfan heat exchanger including a housing and fluidly coupled to the fluid outlet of the cooler and configured to extract heat from the heated water, a pressurized gas source fluidly coupled to the first airfan heat exchanger, the pressurized gas source configured to hold a purging gas at a predetermined pressure and further configured to provide a flow of the purging gas from the pressurized gas source to the first airfan heat exchanger, and a controller configured to control the flow of the purging gas from the pressurized gas source to a fluid inlet of the first airfan heat exchanger.

According to one aspect, the cooling system for a fuel cell system also includes a pump fluidly coupled to the cooler. The pump is configured to remove the heated water from the cooler through the fluid outlet of the cooler and provide the heated water to the first airfan heat exchanger.

According to another aspect, the cooling system for a fuel cell system also includes a second heat exchanger including a fluid inlet fluidly coupled to the fluid outlet of the cooler and a fluid outlet fluidly coupled to the airfan heat exchanger. The second heat exchanger is configured to remove waste heat from the heated water from the cooler and provide the waste heat to an external system.

According to another aspect of the cooling system for a fuel cell system, the purging gas is nitrogen.

According to another aspect of the cooling system for a fuel cell system, the pressurized gas source is fluidly coupled to the first airfan heat exchanger at a high point of the housing of the airfan heat exchanger. In some aspects, the airfan configuration is made without pockets to assist in draining the airfan.

According to another aspect of the cooling system for a fuel cell system, the controller includes a solenoid valve configured to automatically open and thereby provide the purging gas to the first airfan heat exchanger when the fuel cell system stops operating.

According to another aspect of the cooling system for a fuel cell system, the predetermined pressure is 25 psig or more.

According to another aspect of the cooling system for a fuel cell system, the predetermined pressure is in a range of between 25 psig and 2000 psig.

According to another aspect, the cooling system for a fuel cell system also includes a check valve connected to the pressurized gas source. The check valve is configured to prevent a backflow of water into the pressurized gas source from the airfan heat exchanger.

According to a third exemplary embodiment, a method of fast draining an airfan heat exchanger, includes the steps of (a) providing an airfan heat exchanger, (b) providing a pressurized gas source in fluid connection with the airfan heat exchanger, the pressurized gas source configured to hold a purging gas at a predetermined pressure, (c) delivering the purging gas to the airfan heat exchanger, and (d) purging water from the airfan heat exchanger. The pressurized gas source includes a fluid outlet in fluid connection with a check valve, the check valve configured to prevent a backflow of water from the airfan heat exchanger into the pressurized gas source.

According to one aspect of the method, the step of delivering the purging gas to the airfan heat exchanger is automatically controlled by a solenoid valve.

According to another aspect of the method, the purging gas is nitrogen.

According to another aspect of the method, the step of purging water from the airfan heat exchanger is completed in less than 1 minute after the fuel cell system stops operating.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a system for fast draining of an airfan heat exchanger of a cooling system is shown according to various exemplary embodiments. The system is configured to drain water from the airfan heat exchanger in less than one minute, even during periods of power outages or interruptions, such that water is removed from the airfan heat exchanger and prevented from freezing inside the airfan heat exchanger when the ambient temperature is below freezing. The system is configured to be used with a closed cooling system in which ambient air cannot be used (for example, ambient air cannot be used in a cooling system for a fuel cell system). Alternatively, the system herein disclosed and described may be used in an open cooling system.

Figure 1:
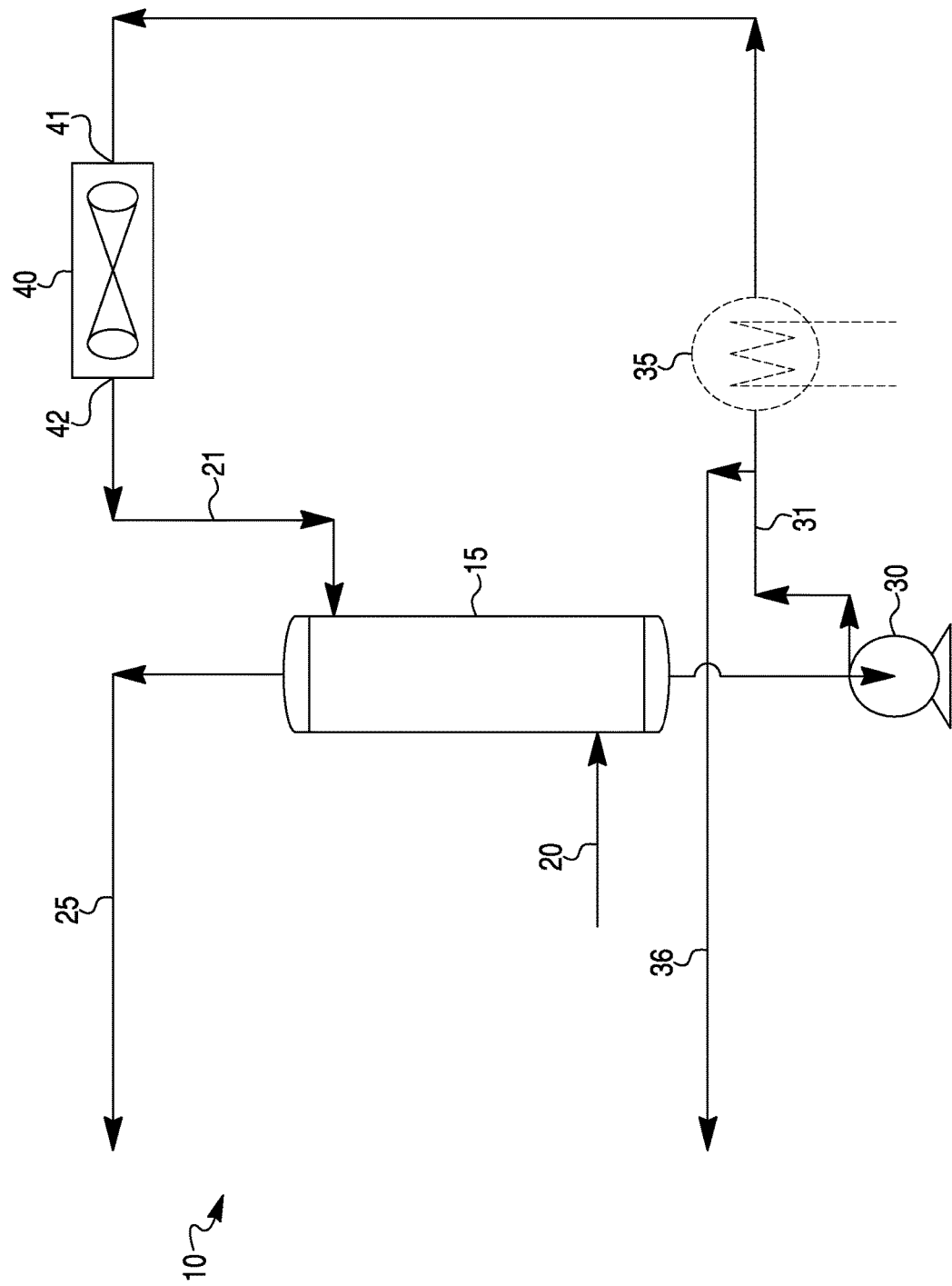
FIG. 1 is a schematic diagram illustrating a prior art cooling system of a fuel cell system which includes an airfan heat exchanger.

Referring to FIG. 1, a prior art cooling system which may be useable with a fuel cell system is shown. The cooling system 10 includes a Direct Contact Cooling Tower ("DCCT") (e.g., cooler) 15 which is configured to receive hot and/or wet anode exhaust gas from an external source, such as a fuel cell system (e.g., a high temperature fuel cell system) via inlet line 20. The cooler 15 allows the hot and/or wet anode exhaust gas to come into direct contact with coolant water within the cooler 15. Typically, the DCCT will have packing or trays to increase the contact between the hot anode exhaust gas and the cooling water. The direct contact between the hot anode exhaust gas and the coolant water provides cooling of the anode exhaust gas with a very low pressure drop and also allows recovery of the water that is condensed from the gas. When the coolant water comes into contact with the hot and/or wet anode exhaust gas in the cooler 15, heat from the gas and water condensation is transferred to the water, causing the water to become hot. Cooled and/or partially dry anode exhaust gas then exits the cooler 15 via outlet line 25.

The heated water is then removed from cooler 15 by a pump 30 and delivered to a first airfan heat exchanger 40 via line 31. Optionally, before the heated air is provided to the airfan 40, waste heat may be recovered by cooling the water in a second heat exchanger 35 when heated water is provided by the pump 30 to the heat exchanger 35 via line 31. The waste heat extracted by the heat exchanger 35 may be provided to an external device or system (not shown). A portion of the heated water (e.g., the water condensed from the anode exhaust as it is cooled) is exported via line 36. Heated water enters the first airfan 40 via a water inlet 41. When the heated water enters the first airfan 40, the heated water is cooled using the airfan 40 such that heat from the heated water is transferred to the air by the airfan 40. Cooled water is then expelled from the airfan 40 via a water outlet 42 and sent to the cooler 15 via line 21.

Figure 2:
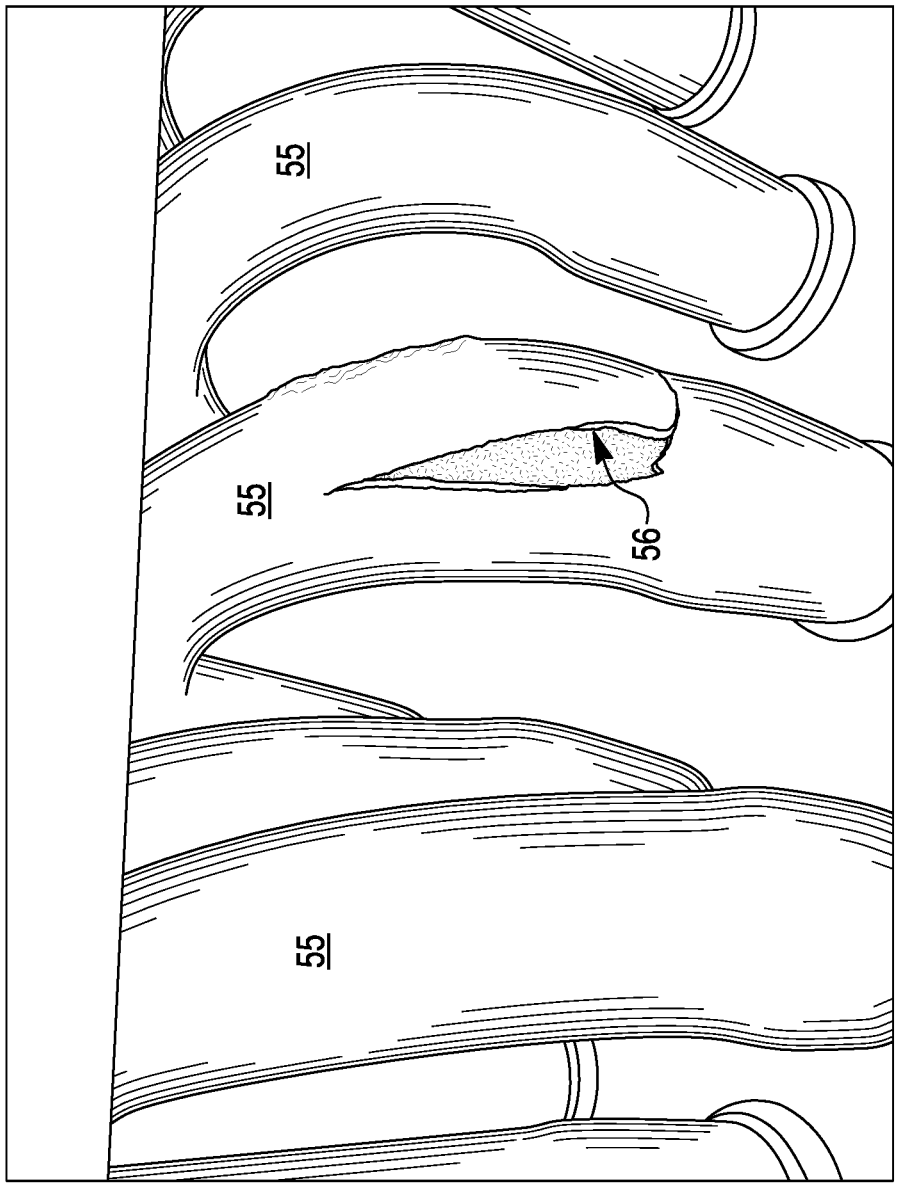
FIG. 2 shows freeze damage to water-filled tube bends of the airfan heat exchanger shown in FIG. 1.

FIG. 2 shows tube bends 55 of an airfan such as may be implemented within the airfan 40 shown in FIG. 1. One of the tube bends 55 shown in FIG. 2 has been damaged due to freezing of water inside the tube bends 55. For example, the damaged tube bend 55 includes rupture 56, caused by an expansion of freezing water within one of the tube bends 55. Similar damage has occurred in other airfan tube locations. One of the problems encountered during operation of the cooling system 10 shown in FIG. 1 is that during very cold weather, water in the airfan 40 can freeze in the tube bends 55 when the cooling system trips or stops operating (e.g., there is a power outage or interruption to the cooling system 10 or related system). For example, water in the airfan 40 may freeze before the water can be drained from the airfan because vapor from a DCCT or cooler 15 is required to travel to a high point of the airfan 40 before water can drain out of the airfan 40. The damage caused by the freezing water in the airfan 40 (e.g., the damage caused to tube bends 55) requires repair before restart of the cooling system and/or the fuel cell system is possible.

Figure 3:
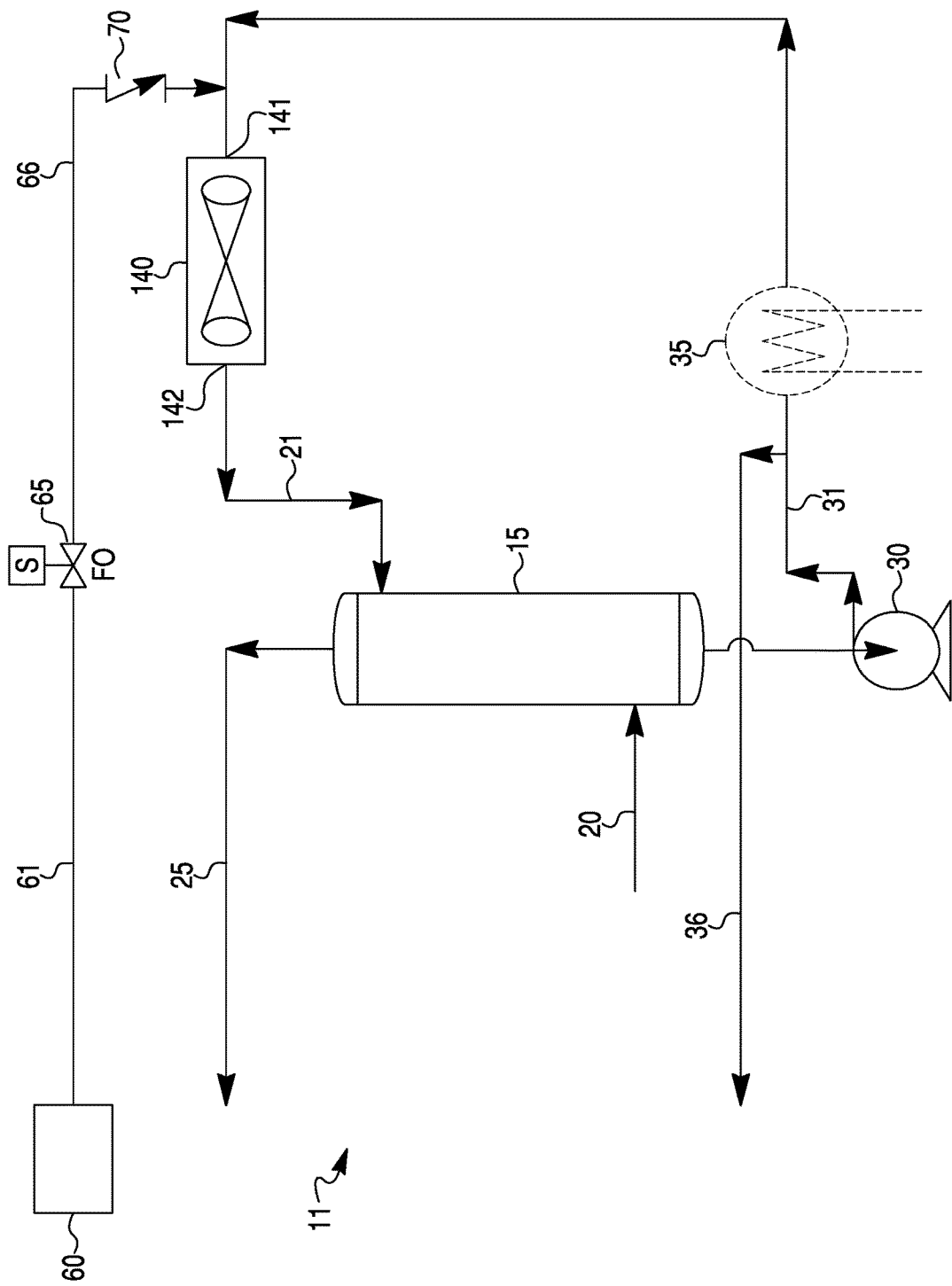
FIG. 3 is a schematic diagram illustrating a cooling system which includes an airfan heat exchanger and a pressurized gas source, according to an exemplary embodiment.
Figure 4:
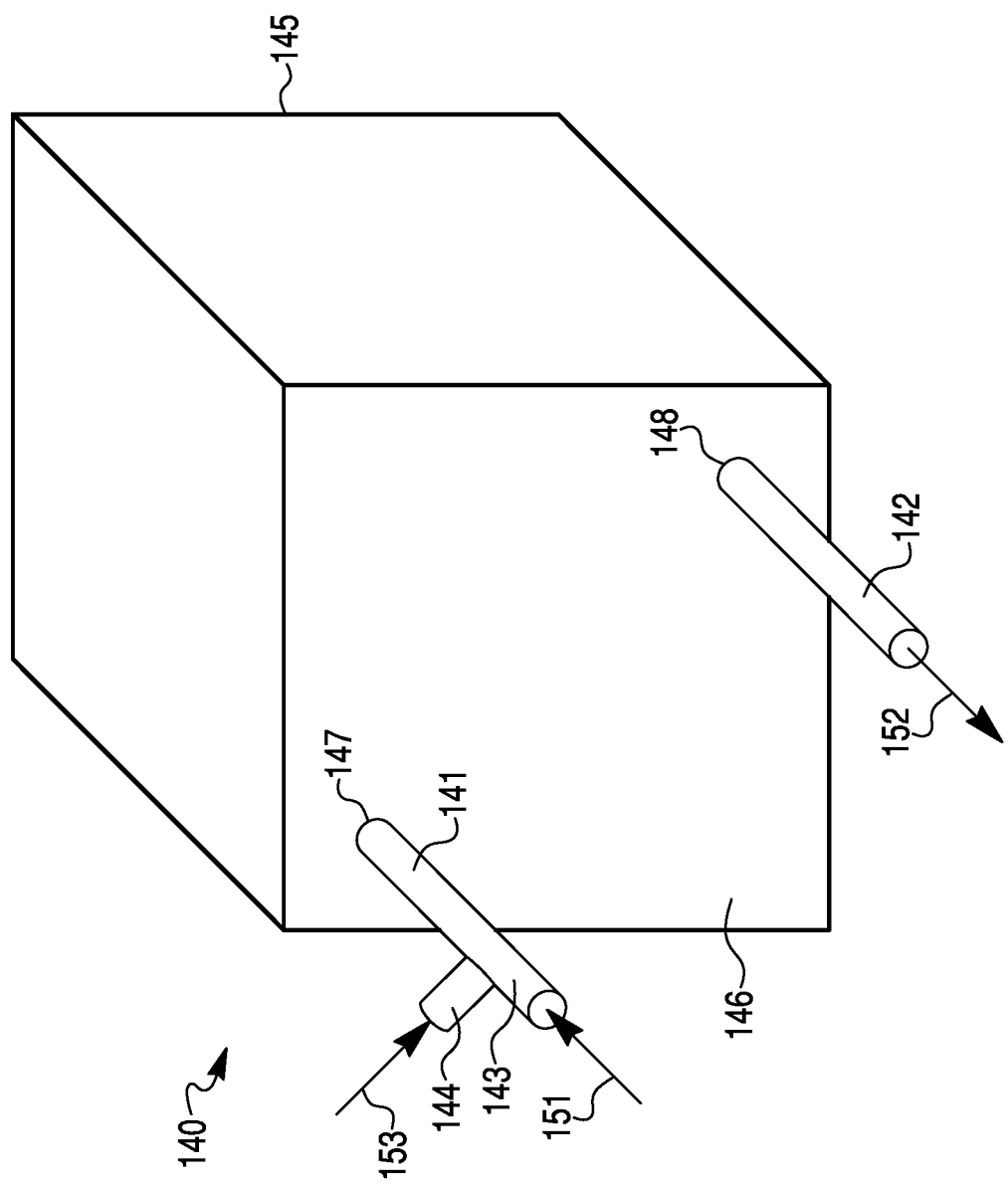
FIG. 4 is a perspective view of the airfan heat exchanger illustrated in FIG. 3.

As shown in FIGS. 3-4, the present disclosure is directed to a cooling system useable with various external systems (such as a fuel cell system, e.g., a high temperature fuel cell system). The cooling system 11 is configured to drain water from an airfan heat exchanger 140 when the cooling system 11 and/or external system(s) stop operating. The cooling system 11 is configured to prevent freeze damage to the airfan heat exchanger 140 caused by freezing water which is left in the airfan heat exchanger 140 when normal operation of the system 11 is interrupted during cold weather. In particular, the system 11 is configured to achieve draining of water from the airfan heat exchanger 140 in less than 1 minute (as opposed to conventional systems, such as those shown in FIG. 1, which may require at least 2-4 minutes to completely drain the water from the airfan 40).

Referring to FIG. 3, the system 11 includes a cooler (e.g., DCCT) 15 fluidly coupled to a pump 30. The pump 30 is also fluidly coupled to an airfan heat exchanger 140. The airfan heat exchanger is configured to receive a fluid flow from the pump 30 and provide a fluid flow to the cooler 15. A pressurized gas source 60 is fluidly coupled to the airfan heat exchanger 140. A controller 65 controls a fluid flow from the pressurized gas source 60 to the airfan heat exchanger 140. Typically, the controller is a fail open (FO) solenoid valve which will open based on a control signal or on loss of power. A check valve 70 prevents a fluid flow from the airfan heat exchanger 140 to the gas source 60.

As shown in FIG. 3, system 11 includes some components similar to those shown in system 10 shown in FIG. 1, and these similar components are denoted with identical reference numerals. As shown in FIG. 3, the cooling system 11 includes a cooler 15 which is configured to receive a hot gas, such as hot and/or wet anode exhaust gas from a fuel cell system (e.g., a high temperature fuel cell, not shown) via inlet line 20. The cooler 15 allows the hot gas to come into direct contact with coolant water. The direct contact with the coolant water provides cooling of the hot gas with a very low pressure drop and recovers the water that is condensed from the gas. When the coolant water comes into contact with the hot gas in the cooler 15, heat from the hot gas is transferred to the water, causing the water to heat. Cooled and/or partially dry anode exhaust gas then exits the cooler 15 via outlet line 25.

The heated water is then removed from cooler 15 by a pump 30 and delivered to an airfan heat exchanger (or airfan or first heat exchanger) 140. Optionally, before the heated air is delivered to the airfan 140, waste heat may be recovered by cooling the water in a second heat exchanger 35. The waste heat extracted from the water by the second heat exchanger 35 may be provided to an external system or systems. Heated water exits the pump 30 via line 31 and enters the airfan 140 via a fluid inlet 141 of the airfan heat exchanger 140. When the heated water enters the airfan heat exchanger 140, the heated water is cooled using the airfan heat exchanger 140 such that heat from the heated water is transferred to the air by the airfan heat exchanger 140. Cooled water is then expelled from the airfan heat exchanger 140 via a fluid outlet 142.

Referring now to FIG. 4, an airfan heat exchanger 140 of the present disclosure is shown. The airfan heat exchanger 140 may be any commercially available airfan heat exchanger but modified as herein disclosed and described. As shown in FIG. 4, the airfan heat exchanger includes a housing 145, of any suitable size and/or shape. The housing 145 includes a fluid inlet 141 and a fluid outlet 142.

The fluid inlet 141 of the housing 145 is disposed on a high point 147 of a surface 146 of the housing 145. The fluid inlet 141, according to one example, includes a fluid channel (e.g., a pipe). The fluid inlet 141, according to the example shown in FIG. 4, includes a plurality of inlets, such as a first inlet 143 configured to receive a flow of coolant water 151 and a second inlet 144 configured to receive a flow of purging gas 153. The fluid outlet 142 is disposed on a low point 148 of the surface 146 of the housing 145. Although the fluid inlet 141 and the fluid outlet 142 are shown in FIG. 4 on the same surface 146 of the housing 145 of the airfan heat exchanger 140, the present disclosure is not particularly limited to this example. The fluid outlet 142 of the airfan heat exchanger 140 is configured to receive a fluid flow 152 (which according to one example, includes water and/or the purging gas). Referring back to FIG. 3, the fluid flow 152 is provided to the cooling tower 15 via line 21.

Unlike the conventional system 10 illustrated in FIG. 1, the system 11 shown in FIG. 3 includes a pressurized gas source 60 which is in fluid communication with the airfan heat exchanger 140 via a purging line 61 and purging line 66. The pressurized gas source 60 is configured to store a purging gas under a predetermined pressure and provide the purging gas to the fluid inlet via the purging line 61 and the purging line 66. According to an exemplary embodiment, the purging gas is an inert or reducing gas (e.g., a non-oxidative gas) as to avoid creating an explosive mixture in the cooling tower 15 where the purging gas is mixed with hydrogen containing the anode exhaust gas, after the purging gas is expelled from the fluid outlet 142 of the airfan heat exchanger 140 and provided to cooling tower 15 via line 21. According to one particular example, the purging gas is nitrogen. According to another particular example, the purging gas is carbon dioxide. According to another particular example, the purging gas is hydrogen. According to another particular example, the purging gas is an anode exhaust gas.

The purging gas (e.g., nitrogen) is stored in the pressurized gas source 60 at a predetermined pressure. According to one aspect, the predetermined pressure is 25 psig or more. According to another aspect, the predetermined pressure is within a range of 25 psig to 2000 psig. According to another aspect, the predetermined pressure is within a range of 25 psig to 150 psig. According to another aspect, the predetermined pressure is within a range of 25 psig and 100 psig. According to a particular example, in the case in which the purging gas is derived from liquid nitrogen, the predetermined pressure is 100 psig. According to yet another aspect, the predetermined pressure is 1000 psig or above. According to another aspect, the predetermined pressure is within a range of 1000 psig to 2000 psig. According to a particular example, in the case in which the purging gas is bottled gaseous nitrogen, the predetermined pressure is approximately 2000 psig. In one particular aspect, the predetermined pressure is reduced to approximately 25 psig using a pressure control valve (not shown) before sending the purging gas to the airfan heat exchanger 140.

A controller 65 controls the flow of the purging gas through purging line 66 and thereby controls a delivery of the purging gas to the fluid inlet 141 of the airfan heat exchanger 140. The controller 65 is configured to allow the purging gas to flow through purging line 66 in an event that there is a power interruption or outage to the cooling system 11, the airfan heat exchanger 140 or a related system (such as a fuel cell system). For example, the cooling system 11 may stop operating due to a power loss. The controller 65 is configured to open automatically in the event the cooling system 11 stops operating. According to one particular example, the controller 65 is a solenoid isolation valve that is configured to open in the event the cooling system 11 stops operating, thereby allowing the purging gas to enter the fluid inlet 141 of the airfan heat exchanger 140 via the purging line 66. The purging line 66 is fluidly coupled to the second inlet 144 of the fluid inlet 141 and is configured to receive the flow of the purging gas 153 and provide the flow of the purging gas 153 to the second inlet 144 of the fluid inlet 141. The fluid inlet 144 is disposed on a high point 147 of the airfan heat exchanger 140. Accordingly, the purging gas is delivered to the airfan heat exchanger 140 at the high point 147 and thereby purges water in the airfan heat exchanger 140 from the high point 147 to the low point 148, where the fluid outlet 142 is located on the airfan heat exchanger 140. The delivery of the flow of purging gas 153 under pressure to the airfan heat exchanger 140 causes water in the airfan heat exchanger 140 to drain rapidly from the cooling system 11 (e.g., the water is drained from the airfan heat exchanger 140 in less than 1 minute, a period short enough to avoid water freezing in the airfan heat exchanger 140). This rapid draining of water from the airfan heat exchanger 140 prevents the water from remaining in the airfan heat exchanger 140 and freezing in the water tubes and tube bends of the airfan heat exchanger 140.

Referring back to FIG. 3, the cooling system 11 also includes a check valve 70 which is located in the purging line 66 relative to the airfan heat exchanger 140 (e.g., adjacent to inlet 144 of the fluid inlet 141 of the airfan heat exchanger 140). The check valve 70 is configured to prevent a backflow of water from the airfan heat exchanger 140 into the purging line 66.

Figure 5:
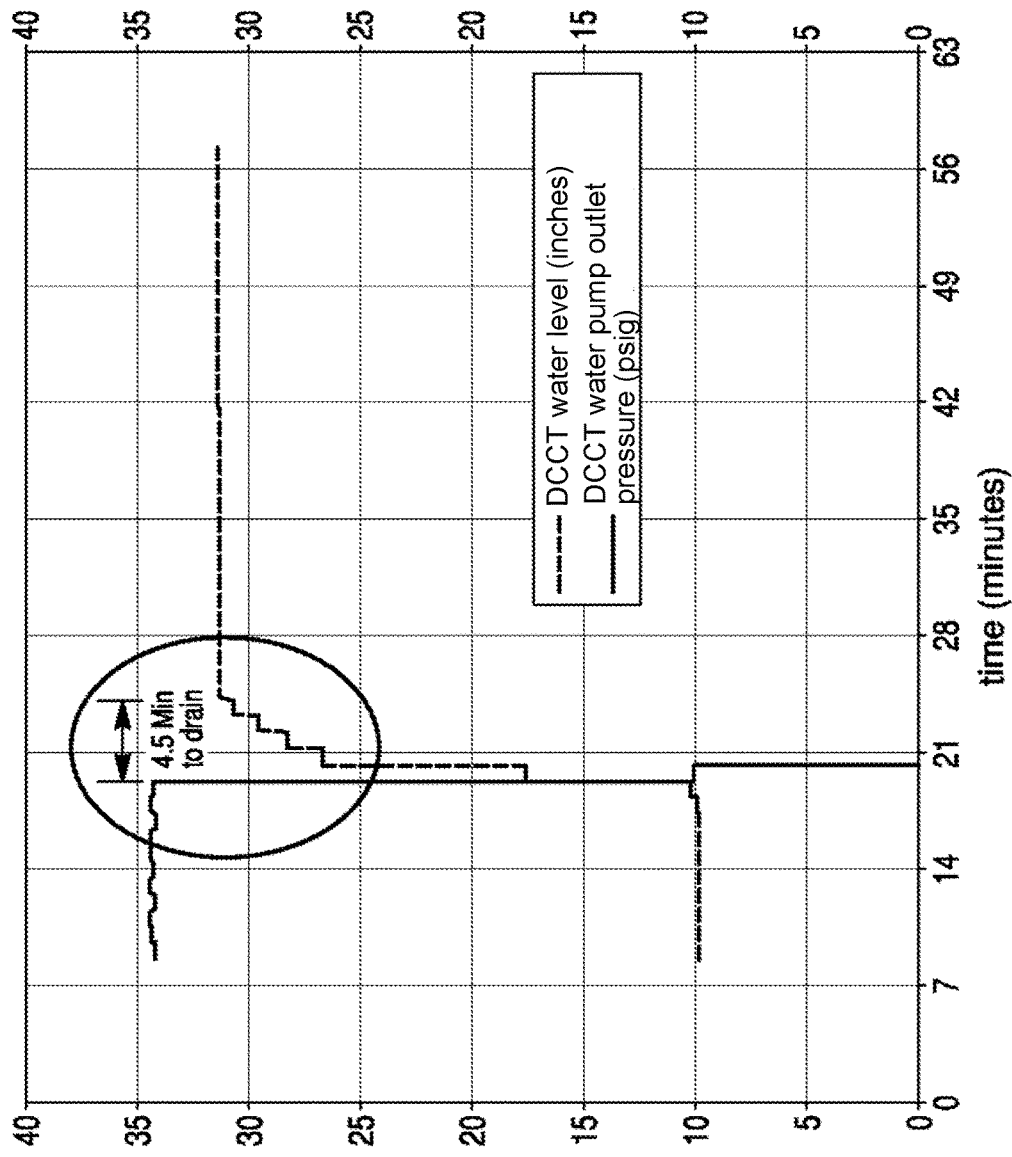
FIG. 5 is a graph depicting experimental results of water-draining performance of the prior art airfan heat exchanger shown in FIG. 1.

FIG. 5 depicts experimental results illustrating the time required to drain water from a prior art airfan heat exchanger 40 shown in FIG. 1. The experimental data shown in FIG. 5 show data collected in 1.0 minute increments over a first period of time lasting approximately one hour. In FIG. 5, a shut-down trip which stops the water circulation to the airfan heat exchanger 40 is indicated by the DCCT water pump outlet pressure going to zero. As the water drains into the DCCT tower 15 from the airfan heat exchanger 40, the DCCT water level increases until all the water is drained. Initially there is a large increase in level due to water draining from the packing inside of the DCCT tower 15. Then the level rises more slowly as water from the airfan heat exchanger 40 drains into the DCCT tower 15. The complete draining of the airfan heat exchanger 40 is indicated when the water level of the DCCT tower 15 stabilizes. According to the experimental results, shown in FIG. 5, water drains from the airfan heat exchanger 40 in about 3-5 minutes after the trip of the system 10 and the stop of the water circulation (i.e., the DCCT water pump outlet pressure going to zero).

Figure 6:
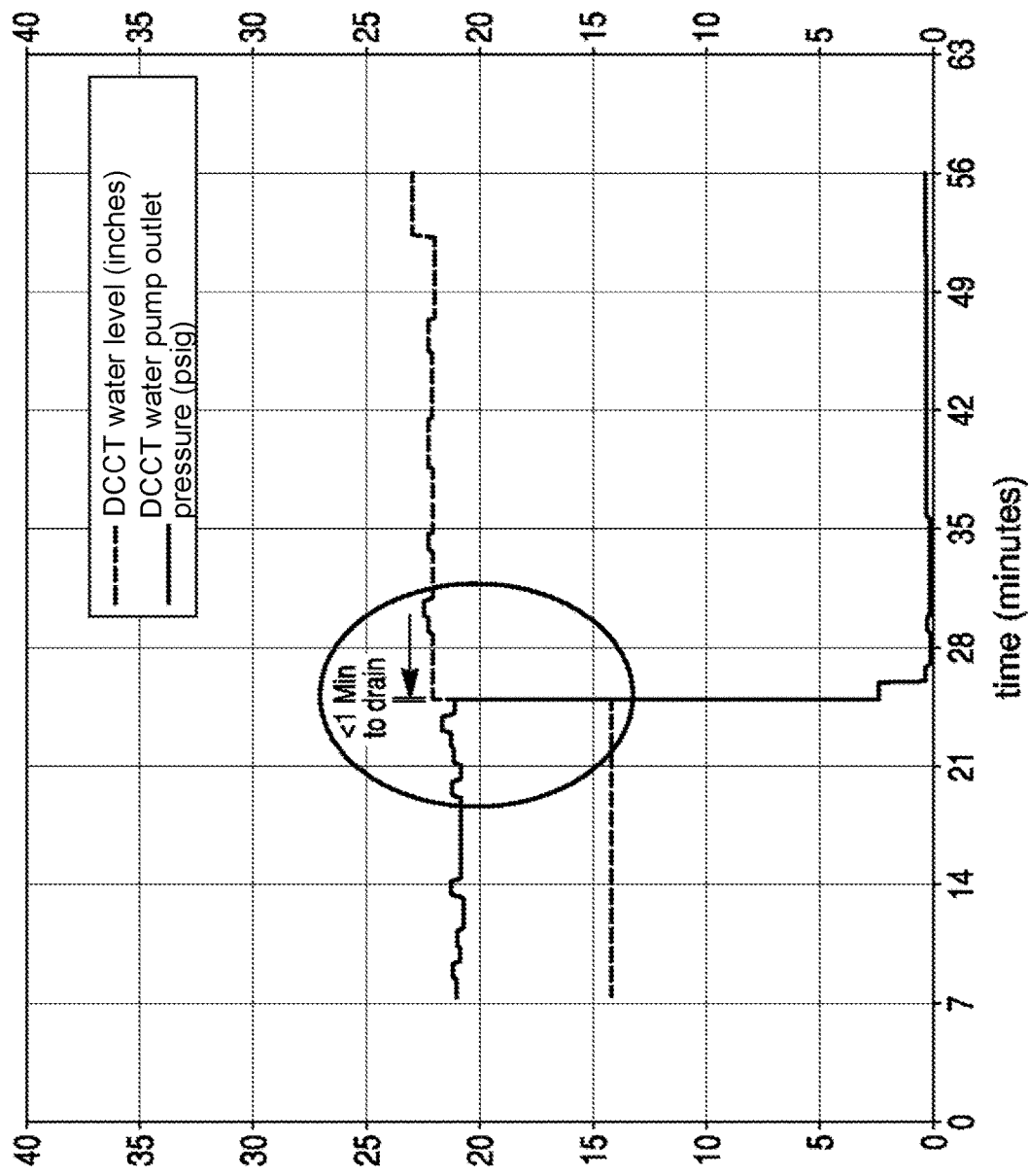
FIG. 6 is a graph depicting experimental results of water-draining performance of the cooling system which includes an airfan heat exchanger and a pressurized gas source shown in FIG. 3.

FIG. 6 depicts experimental data illustrating the time required to drain water from an airfan heat exchanger 140 according to the present disclosure as shown in FIGS. 3-4. The experimental data shown in FIG. 6 show data collected in 1.0 minute increments over a period of time lasting approximately 1 hour. The data show the DCCT water pump outlet pressure and the DCCT water level as a function of time. According to the experimental results shown in FIG. 6, the total amount of time required to drain the airfan heat exchanger 140 is less than 1 minute; that is, the amount of time from the DCCT water pump outlet pressure going to zero and when the water level of the DCCT tower 15 stabilizes at a maximum level is less than 1 minute.

Figure 7:
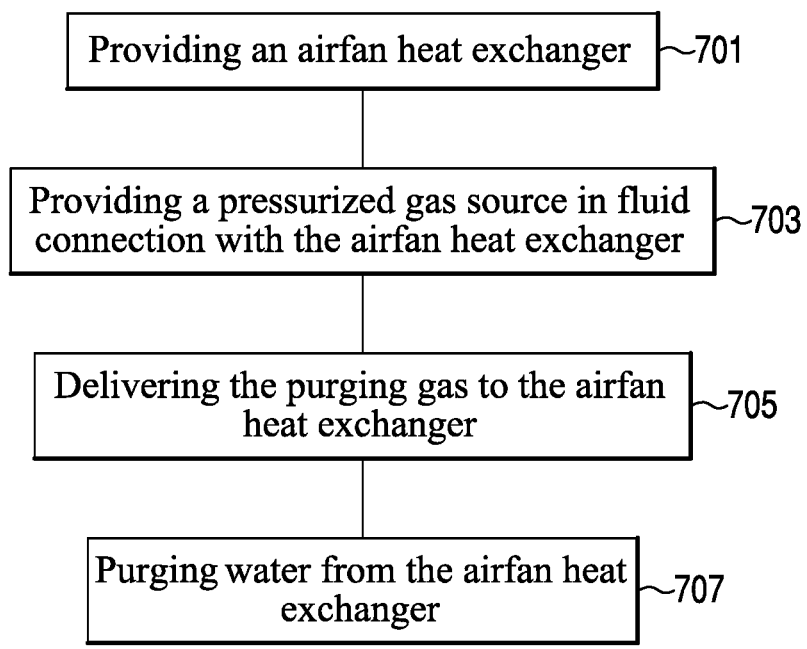
FIG. 7 is a flow chart illustrating a method of draining an airfan heat exchanger, according to an exemplary embodiment.

According to a still further embodiment, a method 700 of fast draining an airfan heat exchanger is shown in FIG. 7. The method 700 includes the step 701 of providing an airfan heat exchanger. The method 700 also includes the step 703 of providing a pressurized gas source in fluid connection with the airfan heat exchanger. The pressurized gas source is configured to hold a purging gas at a predetermined pressure. The method 703 also includes the step 705 of delivering the purging gas to the airfan heat exchanger. The method also includes the step 707 of purging water from the airfan heat exchanger. The pressurized gas source comprises a fluid outlet in fluid connection with a check valve. The check valve is configured to prevent a backflow of water from the airfan heat exchanger into the pressurized gas source. According to one aspect of the method 700, the step of delivering the purging gas to the airfan heat exchanger is automatically controlled by a solenoid valve. According to another aspect of the method 700, the purging gas is nitrogen. According to another aspect of the method 700, the step of purging water from the airfan heat exchanger is completed in less than 1 minute after the fuel cell system stops operating.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom,", "above," "below," etc.) are merely used to described the orientation of various elements in the FIGURES. It should be noted that the orientation of various elements may differ according to other exemplary embodiments and that such variations are intended to be encompassed by the present disclosure.

It is to be understood that although the present disclosure has been described with regard to embodiments thereof, various other embodiments and variants may occur to those skilled in the art, which are within the scope and spirit of the disclosure, and such other embodiments and variants are intended to be covered by corresponding claims. Those skilled in the art will readily appreciated that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes or omissions may also be made in the design, operating conditions and arrangement of the various exemplary embodiments without departing from the scope of the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A system for draining an airfan heat exchanger comprising:
   a cooler including coolant water, the cooler configured to receive an anode exhaust gas from a fuel cell system and to transfer heat from the anode exhaust gas to the coolant water;
   an airfan heat exchanger fluidly coupled to the cooler and configured to receive the heated coolant water, the air fan heat exchanger comprising a housing having a fluid inlet;
   a pressurized gas source fluidly coupled to the fluid inlet of the airfan heat exchanger by a purging line, the pressurized gas source configured to hold a purging gas at a predetermined pressure;
   a check valve coupled to the purging line adjacent to the fluid inlet, the check valve configured to prevent a backflow of water into the purging line and the pressurized gas source from the airfan heat exchanger; and
   a controller configured to control delivery of the purging gas to the airfan heat exchanger, wherein the controller is configured to automatically deliver the purging gas to the airfan heat exchanger in response to a power interruption or a power outage to the fuel cell system;
   wherein the pressurized gas source is configured to provide a flow of the purging gas to the airfan heat exchanger and thereby drain water held in the airfan heat exchanger.

2. The system according to claim 1, wherein the purging gas is nitrogen.

3. The system according to claim 1, wherein the pressurized gas source is fluidly coupled to a fluid inlet of the airfan heat exchanger, wherein the airfan heat exchanger includes a fluid outlet, and wherein the fluid inlet of the airfan heat exchanger is positioned at a higher point of the housing of the airfan heat exchanger than the fluid outlet.

4. The system according to claim 1, wherein the predetermined pressure is 25 psig or more.

5. The system according to claim 1, wherein the predetermined pressure is within a range of 25 psig and 2000 psig.

6. The system according to claim 1, wherein the controller comprises a solenoid valve configured to automatically open and thereby provide the purging gas to the airfan heat exchanger when the airfan heat exchanger stops operating.

7. A cooling system for a fuel cell system, comprising:
   a cooler configured to receive both a hot anode exhaust gas from the fuel cell system and coolant water through a fluid inlet and further configured to expel cooled anode exhaust gas and heated water through a fluid outlet;
   a first airfan heat exchanger comprising a housing having a fluid inlet, the first airfan heat exchanger fluidly coupled to the fluid outlet of the cooler and configured to extract heat from the heated water;
   a pressurized gas source fluidly coupled to the fluid inlet of the first airfan heat exchanger by a purging line, the pressurized gas source configured to hold a purging gas at a predetermined pressure and further configured to provide a flow of the purging gas from the pressurized gas source to the first airfan heat exchanger and thereby drain water held in the first airfan heat exchanger;
   a check valve coupled to the purging line adjacent to the fluid inlet, the check valve configured to prevent a backflow of water into the purging line and the pressurized gas source from the first airfan heat exchanger; and
   a controller configured to control the flow of the purging gas from the pressurized gas source to the fluid inlet of the first airfan heat exchanger, wherein the controller is configured to automatically deliver the flow of the purging gas to the first airfan heat exchanger in response to a power interruption or a power outage to the fuel cell system.

8. The cooling system for a fuel cell system according to claim 7, further comprising a pump fluidly coupled to the cooler, the pump configured to remove the heated water from the cooler through the fluid outlet of the cooler and provide the heated water to the first airfan heat exchanger.

9. The cooling system for a fuel cell system according to claim 7, further comprising a second heat exchanger comprising
   a fluid inlet fluidly coupled to the fluid outlet of the cooler; and
   a fluid outlet fluidly coupled to the airfan heat exchanger, wherein the second heat exchanger is configured to remove waste heat from the heated water from the cooler and provide the waste heat to an external system.

10. The cooling system for a fuel cell system according to claim 7, wherein the purging gas is nitrogen.

11. The cooling system for a fuel cell system according to claim 7, wherein the housing of the first airfan heat exchanger further includes a fluid outlet, wherein the fluid inlet is located at a higher point on the housing than the fluid outlet.

12. The cooling system for a fuel cell system according to claim 7, wherein the controller comprises a solenoid valve configured to automatically open and thereby provide the purging gas to the first airfan heat exchanger when the fuel cell system stops operating.

13. The cooling system for a fuel cell system according to claim 7, wherein the predetermined pressure is 25 psig or more.

14. The cooling system for a fuel cell system according to claim 7, wherein the predetermined pressure is in a range of between 25 psig and 2000 psig.

15. A method of draining an airfan heat exchanger, the method comprising:

(a) providing a cooler including coolant water;
(b) providing an airfan heat exchanger having a fluid inlet, the airfan heat exchanger being fluidly coupled to the cooler;
(c) receiving, by the cooler, an anode exhaust gas from a fuel cell system so as to transfer heat from the anode exhaust gas to the coolant water;
(d) receiving, by the airfan heat exchanger, heated coolant water from the cooler;
(e) providing a pressurized gas source in fluid connection with the fluid inlet of the airfan heat exchanger by a purging line, the pressurized gas source configured to hold a purging gas at a predetermined pressure;
(f) delivering the purging gas to the airfan heat exchanger automatically in response to a power interruption or a power outage to the fuel cell system; and
(g) purging water from the airfan heat exchanger,
wherein the pressurized gas source comprises a fluid outlet in fluid connection with a check valve located in the purging line adjacent to the fluid inlet of the airfan heat exchanger, the check valve configured to prevent a backflow of water from the airfan heat exchanger into the purging line and the pressurized gas source.

16. The method of claim 15, wherein the step of delivering the purging gas to the airfan heat exchanger is automatically controlled by a solenoid valve.

17. The method of claim 15, wherein the purging gas is nitrogen.

18. The method of claim 15, wherein the step of purging water from the airfan heat exchanger is completed in less than 1 minute after the fuel cell system stops operating.

* * * * *